United States Patent [19]

Yanadori et al.

[11] Patent Number: 4,604,223

[45] Date of Patent: Aug. 5, 1986

[54] HEAT STORAGE MATERIAL

[75] Inventors: Michio Yanadori, Hachiooji; Seigo Miyamoto, Takahagi, both of Japan

[73] Assignee: Hitachi, Ltd., Tokyo, Japan

[21] Appl. No.: 611,948

[22] Filed: May 18, 1984

[30] Foreign Application Priority Data

May 20, 1983 [JP] Japan ................................ 58-87411
Aug. 3, 1983 [JP] Japan ............................... 58-141024

[51] Int. Cl.$^4$ ............................................. C09K 5/06
[52] U.S. Cl. ...................................................... 252/70
[58] Field of Search ............................................ 252/70

[56] References Cited

U.S. PATENT DOCUMENTS

| | | | |
|---|---|---|---|
| 3,913,559 | 10/1975 | Dandliker | 252/70 |
| 4,329,242 | 5/1982 | Lane et al. | 252/70 |
| 4,338,208 | 7/1982 | Lane et al. | 252/70 |

FOREIGN PATENT DOCUMENTS

| | | | |
|---|---|---|---|
| 61572 | 9/1983 | Israel . | |
| 50-90585 | 7/1975 | Japan | 252/70 |
| 53-4781 | 1/1978 | Japan | 252/70 |
| 58-23877 | 2/1983 | Japan . | |
| 58-38780 | 3/1983 | Japan | 252/70 |
| 58-136684 | 8/1983 | Japan | 252/70 |

*Primary Examiner*—Paul Lieberman
*Assistant Examiner*—Robert A. Wax
*Attorney, Agent, or Firm*—Antonelli, Terry & Wands

[57] ABSTRACT

The present invention relates to a heat storage material for air conditioning or for waste heat recovery, principally containing magnesium chloride hexahydrate which is doped as a nucleator with synthetic zeolite, magnesium silicate, sodium metasilicate, sodium silicate, calcium silicate, alumina, silicic anhydride, silicon carbide, calcium carbonate and/or calcium fluoride, whereby the heat storage material can be effectively used over a long period of time.

8 Claims, 2 Drawing Figures

HEAT STORAGE MATERIAL

BACKGROUND OF THE INVENTION

1. Field of the Invention

The present invention relates to a heat storage material for air conditioning or for waste heat recovery which principally contains magnesium chloride hexahydrate, and more particularly to a heat storage material with which a nucleator is admixed so as to suppress supercooling.

2. Description of the Prior Art

Since magnesium chloride hexahydrate ($MgCl_2.6H_2O$, melting point: 117° C.) is inexpensive and has high latent heat, it is a hopeful substance as a heat storage material for air conditioning or for waste heat recovery. However, it causes a conspicuous phenomenon of supercooling during heat release and does not release the latent heat even when the temperature has become lower by about 25° C. than its solidifying point.

In order to effectively utilize the magnesium chloride hexahydrate as a heat storage material by suppressing the supercooling thereof, heat storage materials doped with nucleators have been proposed. They are disclosed, for example, in U.S. Pat. No. 4,329,242 entitled "HYDRATED MG(NO3)2MGCL2 REVERSIBLE PHASE CHANGE COMPOSITIONS" and U.S. Pat. No. 4,338,208, entitled "HYDRATED MGCL2 REVERSIBLE PHASE CHANGE COMPOSITIONS". The heat storage materials disclosed here are doped with alkaline nucleators such as strontium hydroxide ($Sr(OH)_2$), calcium oxide (CaO), calcium hydroxide ($Ca(OH)_2$), barium oxide (BaO) and barium hydroxide ($Ba(OH)_2$). Since, however, the magnesium chloride, which is the principal component, is acid, the addition of the alkaline nucleators thereto results in decomposing the heat storage materials. In the course of service, accordingly, the heat storage materials become incapable of phase changes and become useless as such.

OBJECT OF THE INVENTION

The present invention has for its object to provide a heat storage material which suppresses the supercooling phenomenon of magnesium chloride hexahydrate, which is the principal component thereof, and which is usable over a long term without being decomposed.

SUMMARY OF THE INVENTION

The heat storage material of the present invention principally contains magnesium chloride hexahydrate ($MgCl_2.6H_2O$) to which a nucleator for facilitating nucleation is added, the nucleator being at least one substance selected from the group consisting of synthetic zeolite (Molecular Sieves; $M_{2/n}O.Al_2O_3.xSiO_2.yH_2O$, such as $Na_{12}[(AlO_2)_{12}(SiO_2)_{12}].27H_2O$), magnesium silicate ($Mg_2SiO_4$), sodium metasilicate ($Na_2SiO_3$), sodium silicate ($Na_4SiO_4$), calcium silicate ($CaSiO_3.nH_2O$), alumina ($Al_2O_3$), silicic anhydride ($SiO_2$), silicon carbide (SiC), calcium carbonate ($CaCO_3$), calcium fluoride ($CaF_2$), and derivatives thereof.

By way of example, the derivative of magnesium silicate is magnesium silicate pentahydrate ($Mg_2Si_3O_8.5H_2O$), and the derivatives of sodium metasilicate are sodium metasilicate pentahydrate ($Na_2SiO_3.5H_2O$) and sodium metasilicate nonahydrate ($Na_2SiO_3.9H_2O$).

Any one of the nucleators is neutral or acid. Accordingly, even when the nucleator is added to the magnesium chloride hexahydrate which is acid, the nucleator does not decompose the magnesium chloride hexahydrate, and the heat storage material can be utilized as such over a long period of time.

The nucleator or nucleators should, preferably, be added in a total quantity of addition ranging from 0.01 part to 10 parts by weight. The reason is that, when the quantity of addition is below 0.01 part by weight, the nucleating action is slight; whereas when it is above 10 parts by weight, the heat storage effect decreases.

Further, when glass fibers which trap or hold air bubbles within the material are added together with the nucleator or nucleators, the degree of supercooling can be more suppressed.

DETAILED DESCRIPTION OF THE INVENTION

Examples of the heat storage material of the present invention are described hereinafter.

Example 1

Figure 1:
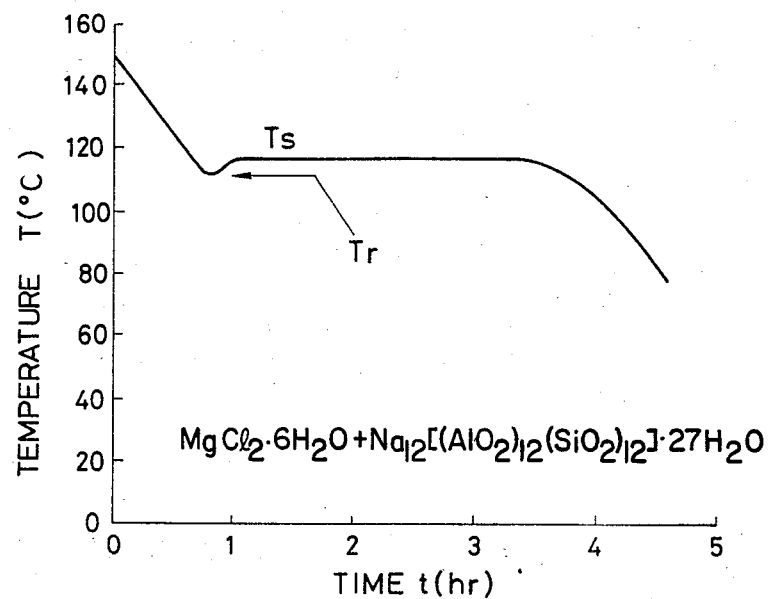
FIG. 1 is a graph showing the solidification characteristic of an example of the heat storage material of the present invention which comprises magnesium chloride hexahydrate and synthetic zeolite, Type 4A.

A mixture in which 1 gram of synthetic zeolite; Type 4A, was added to 100 grams of magnesium chloride hexahydrate and was put in a glass vessel, the vessel was held in an electric furnace at 150° C. until the mixture melted completely. Thereafter, the molten mixture was let stand for cooling in the air at a temperature of 25° C. The mixture stopped supercooling at 114° C., and started the release of latent heat when its solidifying point $T_s = 117°$ C. was restored. In this experiment, it has been revealed that the degree of supercooling $\Delta T_s$; namely, the difference between the solidifying pont $T_s$ and the supercooling recovery temperature $T_r$ becomes as small as 3° C. The result is illustrated in FIG. 1. When the same sample was subjected to similar experiments 30 times, the degree of supercooling $\Delta T_s$ was also about 3° C. When the synthetic zeolite; Type 4A was replaced with synthetic zeolite; Type 5A, it has been revealed that the effect is substantially the same. The latent heat of each of the heat storage materials measured by a differential calorimeter was 41 kcal/kg.

Example 2

A mixture in which 0.01 gram of calcium silicate was added to 100 grams of magnesium chloride hexahydrate was put in a glass vessel, and experiments, as in Example 1, were conducted. As a result, it has been revealed that the degree of supercooling $\Delta T_s$ is 6° C. The latent heat of the heat storage measured by the differential calorimeter was 41 kcal/kg.

Similar experiments were conducted as additional examples with other nucleators, and the results of the experiments, including those of the above examples, are listed in Table 1.

It is understood from Table 1 that any of the materials doped with the nucleators becomes much smaller in the degree of supercooling $\Delta T_s$ than the material doped with no nucleator (No. 9).

Further, experiments in which a plurality of nucleators were simultaneously added were carried out. Then, it has been revealed that the effect is more enhanced than in the case of adding a single nucleator. The results are listed in Table 2.

It has also been revealed that the degree of supercooling further decreases by approximately 50% when the glass fibers which hold air bubbles are added to the heat storage material doped with a plurality of nucleators. Such an example is indicated as No. 10. The principal component of the glass fibers used in this example is $SiO_2$ or $Na_2Ca(SiO_{2,4})_5$. The glass fibers serve also for the prevention of two-phase separation. The glass fibers holding air bubbles can be simply prepared in such a way that a glass fiber bundle joined long is severed fine with scissors or the like.

Figure 2:
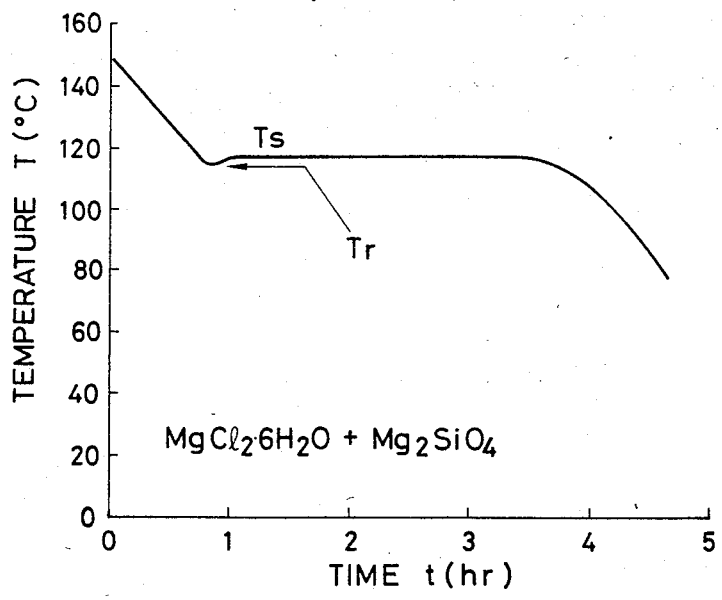
FIG. 2 is a graph showing the solidification characteristic of another example of the heat storage material of the present invention which comprises magnesium chloride and magnesium silicate.

It will be understood that the glass fibers have a diameter of from 10 to 500 micron meter and are endless; that is, the fibers may have limitless length dependent on the dimension of the mass of the heat storage material. Also, the ratio of air bubble volume to glass fiber volume is from 1 to 70%; whereas the ratio of glass fiber volume to heat storage material volume is from 1 to 20%. It has been found that below 1%, the glass fibers do not suppress supercooling, whereas above 20%, the heat storage effect decreases. Moreover, the air bubbles are included with the bundle of glass fibers added to the material.

stored. In this experiment, it has been revealed that the degree of supercooling $\Delta T_s$; namely, the difference between the solidifying point $T_s$ and the supercooling recovery temperature $T_r$ becomes as small as 2° C. The result is illustrated in FIG. 2. When the same sample was subjected to similar experiments 20 times, the degree of supercooling $\Delta T_s$ was also about 2° C. The latent heat of the heat storage material measured by a differential calorimeter was 41 kcal/kg. When a similar experiment was conducted with magnesium silicate pentahydrate substituted for the magnesium silicate, the degree of supercooling could also be suppressed to 2° C.

Example 4

A mixture in which 1 gram of sodium metasilicate pentahydrate was added to 100 grams of magnesium chloride hexahydrate was put in a glass vessel, and experiments as in Example 3 were conducted. As a result, it has been revealed that the degree of supercooling $\Delta T_s$ is 5° C. The latent heat of the heat storage material measured by the differential calorimeter was 41 kcal/kg. When a similar experiment was conducted with sodium metasilicate nonahydrate substituted for the sodium metasilicate pentahydrate, the degree of supercooling could also be suppressed to 5° C.

Example 5

A mixture in which 0.05 gram of sodium silicate was added to 100 grams of magnesium chloride hexahydrate was put in a glass vessel, and experiments, as in Example

TABLE 1

Measured Results of the Degrees of Overcooling

| No. | Heat Storage Material | Nucleator | Degree of Overcooling ($\Delta T_s$) |
| --- | --- | --- | --- |
| 1 | $MgCl_2.6H_2O$ (100 g) | Synthetic zeolite; Type 4A (1 g) | 3° C. |
| 2 | $MgCl_2.6H_2O$ (100 g) | Synthetic zeolite; Type 5A (1 g) | 3° C. |
| 3 | $MgCl_2.6H_2O$ (100 g) | $CaSiO_3.nH_2O$ (0.01 g) | 6° C. |
| 4 | $MgCl_2.6H_2O$ (100 g) | $Al_2O_3$ (0.2 g) | 12° C. |
| 5 | $MgCl_2.6H_2O$ (100 g) | $SiO_2$ (0.1 g) | 10° C. |
| 6 | $MgCl_2.6H_2O$ (100 g) | SiC (0.02 g) | 7° C. |
| 7 | $MgCl_2.6H_2O$ (100 g) | $CaCO_3$ (0.05 g) | 11° C. |
| 8 | $MgCl_2.6H_2O$ (100 g) | $CaF_2$ (0.1 g) | 8° C. |
| 9 | $MgCl_2.6H_2O$ (100 g) | None | 25° C. |

TABLE 2

Measured Results of the Degrees of Overcooling

| No. | Heat Storage Material | Nucleators | Degree of Overcooling ($\Delta T_s$) |
| --- | --- | --- | --- |
| 1 | $MgCl_2.6H_2O$ (100 g) | Synthetic zeolite; Type 4A (1 g) + SiC (1 g) | 1° C. |
| 2 | $MgCl_2.6H_2O$ (100 g) | Synthetic zeolite; Type 4A (0.1 g) + $CaCO_3$ (0.5 g) | 2° C. |
| 3 | $MgCl_2.6H_2O$ (100 g) | Synthetic zeolite; Type 4A (0.5 g) + $CaSiO_3.nH_2O$ (0.1 g) | 1° C. |
| 4 | $MgCl_2.6H_2O$ (100 g) | Synthetic zeolite; Type 4A (0.1 g) + $CaF_2$ (0.5 g) | 1° C. |
| 5 | $MgCl_2.6H_2O$ (100 g) | Synthetic zeolite; Type 4A (0.2 g) + $Al_2O_3$ (0.2 g) | 2° C. |
| 6 | $MgCl_2.6H_2O$ (100 g) | Synthetic zeolite; Type 4A (0.6 g) + $SiO_2$ (0.03 g) | 2° C. |
| 7 | $MgCl_2.6H_2O$ (100 g) | $CaSiO_3.nH_2O$ (0.03 g) + Sic (0.3 g) | 4° C. |
| 8 | $MgCl_2.6H_2O$ (100 g) | $CaCO_3$ (0.01 g) + $CaF_2$ (0.01 g) | 6° C. |
| 9 | $MgCl_2.6H_2O$ (100 g) | None | 25° C. |
| 10 | $MgCl_2.6H_2O$ (100 g) | Synthetic zeolite; Type 4A (1 g) + SiC (1 g) + glass fibers holding air bubbles | 0.5° C. |

Example 3

A mixture in which 0.01 gram of magnesium silicate was added to 100 grams of magnesium chloride was put in a glass vessel, and the vessel was held in an electric furnace at 150° C. until the mixture melted completely. Thereafter, the molten mixture was let stand for cooling in the air at a temperature of 25° C. The mixture stopped supercooling at 115° C., and started the release of latent heat when its solidifying point $T_s = 117°$ C. was re- 3, were conducted. As a result, it has been revealed that the degree of supercooling $\Delta T_s$ is 3° C. The latent heat of the heat storage material measured by the differential calorimeter was 41 kcal/kg.

The above results are collectively listed in Table 3. From this table, it is understood that any of the materials doped with the nucleators becomes much smaller in the degree of supercooling $\Delta T_s$ than the material doped with no nucleator (No. 4).

Further, experiments in which a plurality of nucleators were simultaneously added were carried out. Then, it has been revealed that the effect is more enhanced than in the case of adding a single nucleator. The results are listed in Table 4.

It has also been revealed that the degree of supercooling further decreases by approximately 50% when glass fibers holding air bubbles are mixed to the heat storage material doped with a plurality of nucleators. Such an example is indicated as No. 4 in Table 4. The glass fibers serve also for the prevention of two-phase separation.

The quantity of addition of the nucleator or nucleators may well be very slight, and even the 0.01 part by weight produces the satisfactory effect as indicated in the examples. The upper limit of the quantity of addition of the nucleator or nucleators is not especially set, but it should, preferably, be at most 10 parts by weight because the addition in a very large quantity decreases the capacity of heat storage.

TABLE 3

| | Measured Results of the Degrees of Overcooling | | |
|---|---|---|---|
| No. | Heat Storage Material | Nucleator | Degree of Overcooling ($\Delta T_s$) |
| 1 | $MgCl_2.6H_2O$ (100 g) | $Mg_2SiO_4$ or $Mg_2Si_3O_8.5H_2O$ (0.01 g) | 2° C. |
| 2 | $MgCl_2.6H_2O$ (100 g) | $Na_2SiO_3.5H_2O$ or $Na_2SiO_3.9H_2O$ (1 g) | 5° C. |
| 3 | $MgCl_2.6H_2O$ (100 g) | $Na_4SiO_4$ (0.05 g) | 3° C. |
| 4 | $MgCl_2.6H_2O$ (100 g) | None | 25° C. |

TABLE 4

| | Measured Results of the Degrees of Overcooling | | |
|---|---|---|---|
| No. | Heat Storgae Material | Nucleators | Degree of Overcooling ($\Delta T_s$) |
| 1 | $MgCl_2.6H_2O$ (100 g) | $Mg_2Si_3O_8.5H_2O$ (0.01 g) + $Na_2SiO_3.5H_2O$ (1 g) | 1° C. |
| 2 | $MgCl_2.6H_2O$ (100 g) | $Mg_2SiO_4$ (0.01 g) + $Na_2SiO_4$ (0.05 g) | 1° C. |
| 3 | $MgCl_2.6H_2O$ (100 g) | None | 25° C. |
| 4 | $MgCl_2.6H_2O$ (100 g) | $Mg_2Si_3O_8.5H_2O$ (0.01 g) + $Na_2SiO_3.5H_2O$ (1 g) + glass fibers holding air bubbles | 0.5° C. |

As set forth above, according to the present invention, a neutral or acid nucleator is added to magnesium chloride which is acid. Therefore, a heat storage material is prevented from becoming incapable of phase changes on account of the decomposition of the magnesium chloride, and the heat storage material which can be effectively utilized for a long term can be provided.

What is claimed is:

1. A heat storage material comprising magnesium chloride hexahydrate ($MgCl_2.6H_2O$), and a nucleator which is admixed with said magnesium chloride hexahydrate and which includes at least one substance selected from the group consisting of magnesium silicate ($Mg_2SiO_4$), sodium metasilicate ($Na_2SiO_3$), calcium silicate ($CaSiO_3.nH_2O$), silicon carbide (SiC), calcium carbonate ($CaCO_3$), and derivatives thereof, a total quantity of addition of said nucleator being in the range of 0.01 to 10 parts by weight, whereby said nucleator suppresses the degree of supercooling of the magnesium chloride hexahydrate while not causing decomposition of the magnesium chloride hexahydrate.

2. A heat storage material according to claim 1, wherein bundles of glass fibers trapping air bubbles are also contained therein.

3. A heat storage material according to claim 1, wherein at least two substances selected from said group are included as said nucleator.

4. A heat storage material according to claim 2, wherein said glass fibers have diameters from 10 to 500 micrometers.

5. A heat storage material according to claim 4, wherein the ratio of air bubble volume to glass fiber volume is in the range of 1–70%.

6. A heat storage material according to claim 5, wherein the ratio of glass fiber volume to heat storage material volume is in the range of 1–20%.

7. A heat storage material according to claim 1, wherein said at least one substance is selected from the subgroup consisting of magnesium silicate ($Mg_2SiO_4$), calcium silicate ($CaSiO_3.nH_2O$), silicon carbide (SiC), and derivatives thereof.

8. A heat storage material according to claim 7, wherein said nucleator includes, in addition to said at least one substance selected from the subgroup, at least one further substance selected from the group consisting of synthetic zeolite, sodium metasilicate ($Na_2SiO_3$), sodium silicate ($Na_4SiO_4$), alumina ($Al_2O_3$), silicic anhydride ($SiO_2$), calcium carbonate ($CaCO_3$), calcium fluoride ($CaF_2$), and derivatives thereof, the total quantity of addition of all nucleators being in the range of 0.01 to 10 parts by weight.

* * * * *